US009832644B2

(12) United States Patent
Moberg et al.

(10) Patent No.: US 9,832,644 B2
(45) Date of Patent: Nov. 28, 2017

(54) SYSTEMS AND METHODS FOR HYBRID HARDWARE AUTHENTICATION

(71) Applicant: SnowShoeFood, Inc., San Francisco, CA (US)

(72) Inventors: Claus Christopher Moberg, Redwood City, CA (US); Jami Li Morton, Dublin, CA (US); Sheradyn Mikul, McFarland, WI (US); Philipe Navarro, St. Augustine Beach, FL (US); Jonathan Igner, San Francisco, CA (US)

(73) Assignee: SNOWSHOEFOOD, INC., San Francisco, CA (US)

( * ) Notice: Subject to any disclaimer, the term of this patent is extended or adjusted under 35 U.S.C. 154(b) by 0 days.

(21) Appl. No.: 15/346,372

(22) Filed: Nov. 8, 2016

(65) Prior Publication Data
US 2017/0055155 A1    Feb. 23, 2017

Related U.S. Application Data

(63) Continuation of application No. 14/847,617, filed on Sep. 8, 2015, now abandoned.
(Continued)

(51) Int. Cl.
*H04W 12/06* (2009.01)
*G06F 21/44* (2013.01)
(Continued)

(52) U.S. Cl.
CPC ......... *H04W 12/06* (2013.01); *A63F 13/2145* (2014.09); *A63F 13/95* (2014.09);
(Continued)

(58) Field of Classification Search
CPC .................................................. H04W 12/06
(Continued)

(56) References Cited

U.S. PATENT DOCUMENTS

| 4,123,631 A | 10/1978 | Lewis |
| 5,559,665 A | 9/1996 | Taranowski et al. |

(Continued)

FOREIGN PATENT DOCUMENTS

| EP | 2535839 A1 | 12/2012 |
| GB | 2519798 A | 5/2015 |

(Continued)

*Primary Examiner* — Jacob Lipman
(74) *Attorney, Agent, or Firm* — Patent Technologies, LLC; Robert D. Gunderman, Jr.

(57) ABSTRACT

A method for hybrid hardware authentication includes at a first electronic system having a capacitive touch sensor, detecting a capacitive hardware interaction between the hybrid hardware tool and the capacitive touch sensor; generating capacitive identification data based on the detected capacitive hardware interaction; at a second electronic system communicatively coupled to the first electronic system, detecting a short-range wireless interaction between the hybrid hardware tool and the second electronic system; generating wireless identification data based on the detected short-range wireless interaction; and at a third electronic system communicatively coupled to the first and second electronic systems, performing a first action based on a combination of the wireless identification data and the capacitive identification data.

20 Claims, 12 Drawing Sheets

Related U.S. Application Data

(60) Provisional application No. 62/047,507, filed on Sep. 8, 2014.

(51) Int. Cl.

| | |
|---|---|
| *H04W 4/00* | (2009.01) |
| *G06F 21/34* | (2013.01) |
| *G06F 3/039* | (2013.01) |
| *G06F 3/044* | (2006.01) |
| *A63F 13/2145* | (2014.01) |
| *A63F 13/98* | (2014.01) |
| *A63F 13/95* | (2014.01) |

(52) U.S. Cl.
CPC ............. *A63F 13/98* (2014.09); *G06F 3/039* (2013.01); *G06F 3/044* (2013.01); *G06F 21/34* (2013.01); *G06F 21/44* (2013.01); *H04W 4/008* (2013.01); *G06F 2203/04108* (2013.01)

(58) Field of Classification Search
USPC ................................................... 726/3
See application file for complete search history.

(56) References Cited

U.S. PATENT DOCUMENTS

| | | | |
|---|---|---|---|
| 7,106,221 B2 | 9/2006 | Horton et al. | |
| 7,403,191 B2 | 7/2008 | Sinclair | |
| 7,791,506 B2 | 9/2010 | Riihimaki et al. | |
| 8,206,047 B1 | 6/2012 | Isaac et al. | |
| 8,564,538 B2 | 10/2013 | Wadsworth | |
| 8,648,837 B1 | 2/2014 | Tran et al. | |
| 8,702,512 B2 | 4/2014 | Mineur et al. | |
| 8,816,961 B2 | 8/2014 | Buil et al. | |
| 8,854,306 B2 | 10/2014 | Seo et al. | |
| 2003/0235452 A1 | 12/2003 | Kraus et al. | |
| 2004/0056781 A1 | 3/2004 | Rix et al. | |
| 2004/0124248 A1 | 7/2004 | Selker | |
| 2006/0256090 A1 | 11/2006 | Huppi | |
| 2007/0062852 A1 | 3/2007 | Zachut et al. | |
| 2008/0177665 A1 | 7/2008 | Noordam | |
| 2009/0193500 A1 | 7/2009 | Griffin et al. | |
| 2009/0303001 A1 | 12/2009 | Brumer et al. | |
| 2010/0277428 A1 | 11/2010 | Kumazawa | |
| 2010/0321304 A1* | 12/2010 | Rofougaran | G06F 3/046 345/173 |
| 2011/0157056 A1 | 6/2011 | Karpfinger | |
| 2011/0227871 A1 | 9/2011 | Cannon | |
| 2012/0007808 A1 | 1/2012 | Heatherly et al. | |
| 2012/0007817 A1 | 1/2012 | Heatherly et al. | |
| 2012/0120020 A1 | 5/2012 | Lee | |
| 2012/0155323 A1* | 6/2012 | Ramachandran | H04W 24/04 370/254 |
| 2012/0218220 A1 | 8/2012 | Tsai | |
| 2012/0249295 A1 | 10/2012 | Yeung | |
| 2013/0069908 A1 | 3/2013 | Sung | |
| 2013/0083005 A1 | 4/2013 | Arrasvuori | |
| 2013/0135246 A1 | 5/2013 | Aubert et al. | |
| 2013/0162594 A1 | 6/2013 | Paulsen et al. | |
| 2013/0194202 A1 | 8/2013 | Moberg et al. | |
| 2013/0232563 A1 | 9/2013 | Ache et al. | |
| 2013/0339850 A1 | 12/2013 | Hardi et al. | |
| 2014/0046855 A1 | 2/2014 | Moberg | |
| 2014/0073300 A1 | 3/2014 | Leeder et al. | |
| 2014/0123249 A1 | 5/2014 | Davis et al. | |

FOREIGN PATENT DOCUMENTS

| | | |
|---|---|---|
| WO | 2006098690 A1 | 9/2006 |
| WO | 2011126515 A1 | 10/2011 |
| WO | 2011154524 A | 12/2011 |
| WO | 2012136817 A1 | 10/2012 |
| WO | 2015076605 A1 | 5/2015 |

* cited by examiner

SYSTEMS AND METHODS FOR HYBRID HARDWARE AUTHENTICATION

CROSS-REFERENCE TO RELATED APPLICATIONS

This application is a continuation of U.S. patent application Ser. No. 14/847,617, filed 8 Sep. 2015, which claims the benefit of U.S. Provisional Application Ser. No. 62/047,507, filed on 8 Sep. 2014, both of which are incorporated in their entirety by this reference.

TECHNICAL FIELD

This invention relates generally to the consumer electronics field, and more specifically to new and useful systems and methods for hybrid hardware authentication in the consumer electronics field.

BACKGROUND

The link between physical objects and digital information has long been an important part of the entertainment, sales, and security industries. Physical objects give a sense of ownership, are less easily duplicated than digital objects, and can be transferred through traditional sales methods. Further, they provide a realism of play unmatched by digital objects. However, methods to link physical objects to digital information are frequently associated with cost, security, and/or usability issues. Furthermore, disparate types of digital information and different methods of communicating that information result in limited means of linking digital information to physical objects. Thus, there is a need in the consumer electronics field to create systems and methods for hybrid hardware authentication using multiple methods of communicating that information. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

The following system and method descriptions are directed to hybrid hardware authentication. In this document, hybrid hardware authentication refers to hardware authentication based on the use of two or more authentication types; more specifically, authentication based on the use of a capacitively-interactive hardware tool (hereafter referred to as a CHT) and the use of a second distinct authenticator. The second authentication type primarily discussed in this document is authentication based on short-range wireless communications; for example, near field communication (NFC), radio-frequency identification (RFID), and Bluetooth® Low Energy (BLE), but a person of ordinary skill in the art will recognize that the systems and methods described herein may be applicable to multiple other authentication types.

1. Capacitively-Interactive Hardware Tools (CHTs)

Capacitively interactive hardware tools (CHTs) are tools that are able to interact with capacitive touch sensors (such as the capacitive touchscreens of many smartphones and tablets). For example, a CHT could be used with the capacitive touchscreen of a computing device to authenticate a user, allowing access to the computing device. A CHT may additionally or alternatively function to trigger an event or action; for instance, pressing the CHT to a phone screen may both initiate a transfer of money and authenticate the sending party. As another example, pressing the CHT to the phone screen may enable an action in a game, for instance, firing a virtual weapon.

Computing devices usable with CHTs include smartphones, tablets, wearable computing devices, desktop computing devices, touchscreen computing kiosks, remote controls, gaming devices, and/or any suitable computing devices with a capacitive surface input.

Figure 1:
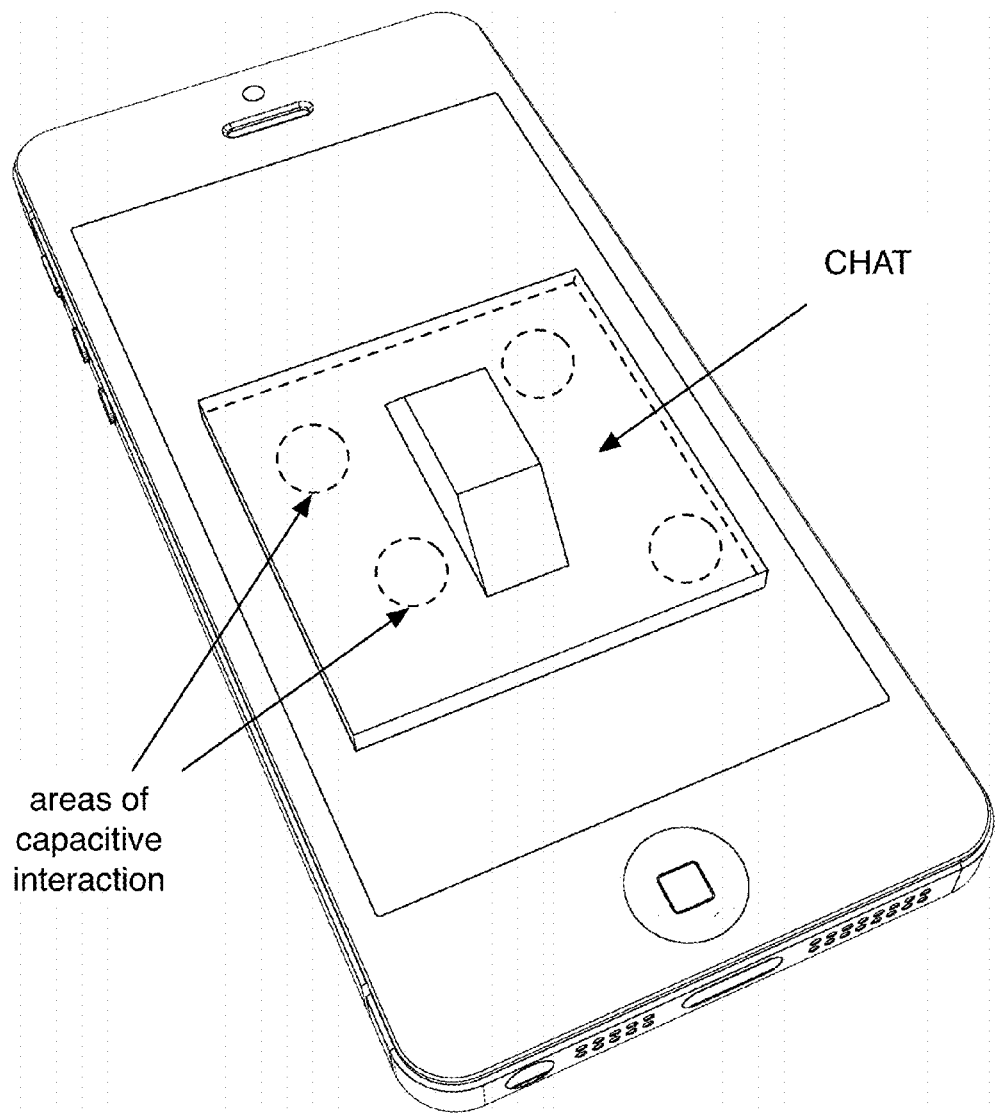
FIG. 1 is an example view of a capacitively-interactive hardware tool.

CHTs preferably enable authentication and/or event triggering on electronic devices by causing capacitive interactions when the CHTs are brought into close proximity or contact with the capacitive touch sensors, as shown in FIG. 1. In some cases, these capacitive interactions may resemble capacitive interactions resulting when a human finger comes into contact with a capacitive touch sensor. Features of these interactions, including their position (absolute or relative), timing, and/or magnitude may affect how a CHT is detected, and thus the information transmitted by the interactions. CHTs causing interactions having different properties are preferably distinguishable from one another. In one example, a CHT has a pattern of grounded conductive traces. This pattern of conductive traces is identified as a number of touches at different locations on an electronic device with a capacitive touch sensor. The electronic device then compares the locations of the touches to a database (which may be local or remote), and upon matching the touch locations to a known pattern in the database, allows access. The electronic device can alternatively obtain a signature or unique identifier that is derived from the locations of the touches. The CHT preferably can be used in conjunction with any electronic device having a capacitive touch sensor, but may alternatively be designed for use with specific electronic devices or specific types of capacitive touch sensors.

Further examples of CHTs and CHT usage may be found in U.S. Provisional Patent Application No. 61/937,015 and U.S. Provisional Patent Application No. 61/973,455, both of which are incorporated in their entireties by this reference.

2. System for Hybrid Hardware Authentication

Figure 2:
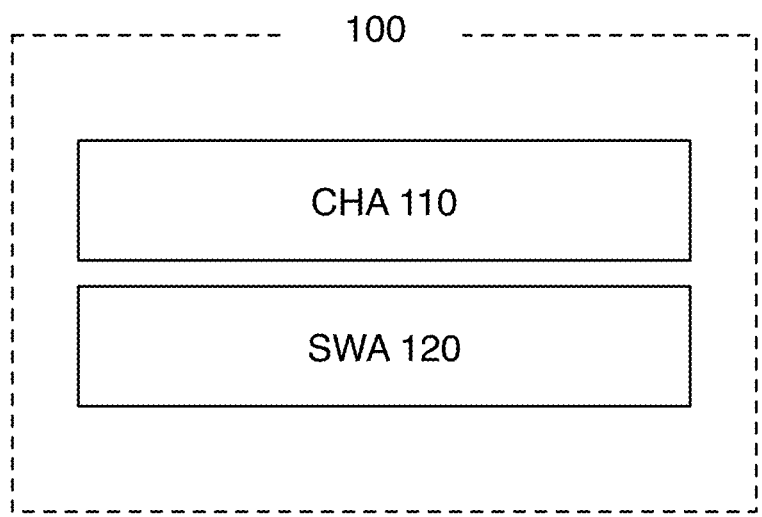
FIG. 2 is a diagram view of a system of a preferred embodiment.

As shown in FIG. 2, a system 100 for hybrid hardware authentication includes a capacitively interactive hardware authenticator (CHA) 110 and a short-range wireless authenticator (SWA) 120. Particular implementations of the CHA may alternatively be referred to as a capacitively interactive module, and the SWA may alternatively be referred to as a radiofrequency identification module (if the SWA performs authentication using RF communication). The system 100 may additionally or alternatively include other authenticators (e.g. a long-range wireless authenticator, a wired authenticator, an optical authenticator, a sonic authenticator, etc.).

The system 100 functions to enable two or more authentication methods in conjunction with the use of electronic systems. The use of multiple authenticators may provide for a number of advantages over single-authenticator systems. For example, multiple authentication methods may be used to increase security by increasing the amount of unique identification data associated with the system 100; that is, if there is some number n of possible unique CHA identifiers and some number m of possible SWA identifiers, the number of unique identifiers available to the system is k=nm if both identifiers are used for authentication. The use of multiple authenticators may also allow for authentication with independent and/or indirectly connected electronic systems. For example, a toy including a CHA 110 and SWA 120 may use the CHA 110 to communicate with a smartphone, but use the SWA 120 to communicate with an NFC-equipped gaming console peripheral. The use of multiple authenticators can also be used to communicate different types of information to a single electronic system. For example, a figurine including a CHA 110 and SWA 120 can use the CHA 110 to launch actions by capacitively interacting in real time with a game being played on an NFC-equipped tablet with a capacitive touchscreen, and use the SWA 120 to periodically validate the authenticity of the figurine via NFC communication with the tablet.

The system 100 may preferably be used with a computing device to authenticate a user, allowing access to the computing device. Authenticating a user's identity for information access is one example of authentication that can be enabled by the system 100; additional examples include authenticating a user's identity for transactions (for instance, transferring money, information, or digital goods from one party to another where the system 100 corresponds to one party), authenticating location (e.g. providing evidence that a transaction occurred at a specific place) and authenticating digital goods (e.g. allowing access or transfer of digital goods to a party possessing a system 100 corresponding to those goods).

The system 100 may additionally or alternatively function to trigger and/or launch an event or action; for instance, pressing a CHA 110 of the system 100 to a phone screen may both initiate a transfer of money and authenticate the sending party. As another example, pressing the CHA 110 to the phone screen may enable an action in a game, for instance, firing a virtual weapon.

In particular, applications of the system 100 may take advantage of the unique characteristics of each authenticator. For example, the CHA 110 may be read by any capacitive touch sensor (e.g. smartphone and tablet touchscreens), while the SWA 120 generally requires a dedicated reader. The CHA 110 requires close proximity or contact to be read, whereas the SWA 120 may operate over longer distances. Additionally, the SWA 120 may be capable of storing and/or transmitting more data than the CHA 110. In general, direction and/or motion may be more easily detected using the CHA 110 than the SWA 120 (at least in the case of a single short-range wireless reader). The SWA 120 might be more easily reprogrammable than the CHA 110 (although not necessarily).

In one example, an application uses the special difficulty of falsifying the CHA 110 to enhance the security of an authentication token. In this example, the CHA 110 and SWA 120 are integrated into a fob that is used for gaining access to a secure building at a large company with many employees. The housing of the fob is 3D printed out of a combination of materials that are visually indistinguishable from one another, but some of which are electrical conductors and some of which are electrical insulators. When an employee presses the fob against a capacitive touch screen at the gate of the secure building, a capacitive hardware interaction occurs and the CHA 110 authenticates the fob as valid and belonging to an employee of the company before information is read from the SWA 120, which may indicate that the employee does or does not have permission to enter the secure building. Even had a non-employee attempted to gain access by cloning the data provided by the SWA 120 (e.g., with an RFID reader), they would have been unable to reproduce the CHA 110.

In another example, an application uses the differing proximity requirements of the CHA 110 and the SWA 120 to judge a user's proximity and intention. A large touch display coupled to an RFID reader and a speaker is placed at the end of a theme-park roller coaster; theme park attendees are given a wristband containing the system 100. As an attendee walks past the touch display, the display's RFID reader detects the attendee's SWA 120 and uses the information transmitted by the SWA 120 to identify the attendee. The touch display's speaker calls out to the attendee by name: "Attendee, your rollercoaster picture is available!" When the attendee walks over to the touch display, he or she has the option to purchase a copy of the rollercoaster picture using the CHA 110 (perhaps in combination with a passphrase). Alternatively, the attendee could use motion-aware CHA 110 authentication techniques to purchase the copy (that is, moving or rotating the CHA 110 in a particular manner on the touch display).

The CHA 110 functions to perform close-proximity and/or contact authentication on capacitive touch sensitive electronic devices. The CHA 110 is preferably substantially similar to the previously described CHT, except for modifications to the CHA 110 that result from integration with the SWA 120 (as later described). Additionally or alternatively, the CHA 110 may be physically independent of the SWA 120 (and thus capable of operating in a similar manner to a stand-alone CHT).

Figure 3:
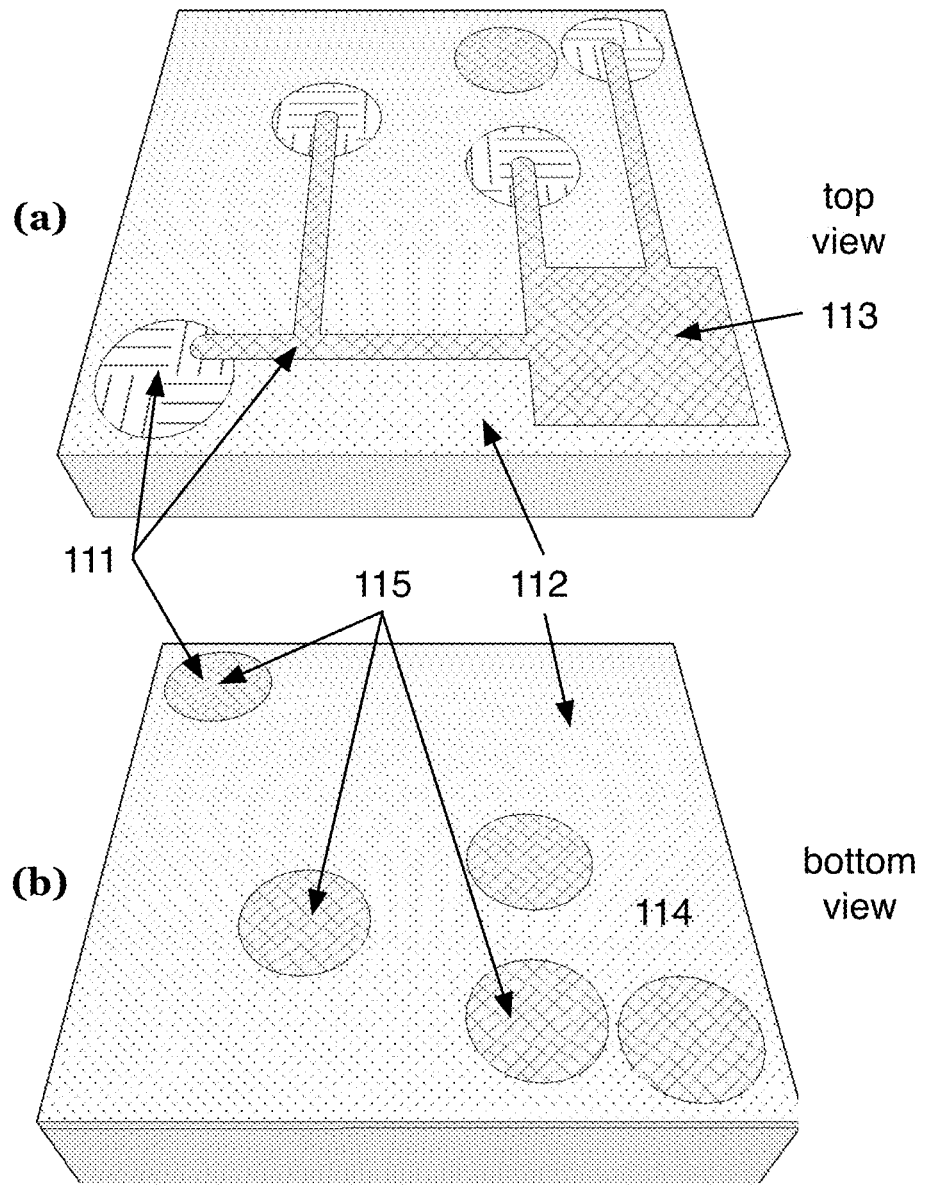
FIG. 3 is a schematic view of a capacitively-interactive hardware authenticator (CHA) of a preferred embodiment.

As shown in FIG. 3, the CHA 110 preferably includes a capacitive contact structure 111, a substrate 112, and a current coupler 113. The capacitive contact structure 111 functions to interact with a capacitive touch sensor of an electronic device by changing a capacitance sensed by the capacitive touch sensor at one or more locations. The capacitive contact structure 111 preferably includes a plurality of capacitive contacts 115, but can alternatively comprise a single capacitive contact or any other suitable arrangement and/or distribution of capacitive contacts 115. The capacitive contact structure 111 preferably comprises all of the conductive elements of the CHA 110, whereas the capacitive contacts 115 preferably comprise the location and/or locations where the structure is placed adjacent to a capacitive touch sensor. The capacitive contact structure 111 is preferably designed to be used with projected capacitive touch (PCT) sensing technology utilizing mutual capacitive sensors (used in multi-touch capacitive sensors) but may alternatively be designed to be used with PCT sensing technology utilizing self-capacitance sensors, with surface capacitance sensing technology, or with any other suitable capacitive sensing technology. The capacitive contact structure 111 is also preferably designed to be detected as human touch, but may alternatively be designed to be detected as distinct from human touch or may alternatively not be designed to be detectable at all. In the case of PCT sensing technology utilizing mutual capacitive sensors, human touch is generally sensed by a drop in capacitance at the sensors; this drop in capacitance is caused by the flow of current away from the sensors (the human finger represents a conductive path to ground through which current may flow). Generally, the drop in capacitance must occur over a large enough area (i.e. over enough sensors) to be detected as a human touch. Each capacitive contact of the capacitive contact structure 111 preferably corresponds to the touch of a single human finger; alternatively, there may be correspondence between any number of capacitive contacts 115 and any number of finger touches or no correspondence at all. A capacitive contact 111 can alternatively correspond to an interaction of any intended input device with a capacitive touch sensor, such as a stylus.

The capacitive contact structure 111 preferably includes a surface 114 which can be placed adjacent to a capacitive touch sensor. The surface 114 preferably includes the capacitive contacts 115 as described above. Alternatively, the capacitive contact structure 111 can comprise a three dimensional shape, a two-dimensional surface in an arbitrary curved shape, a complex polygonal surface, or any other suitable interface containing the capacitive contacts 115 that can be placed against a capacitive touch sensor.

By altering the shape, structure, and materials of the capacitive contact structure 111, the results of capacitive interaction with a capacitive touch sensor may also be altered. More particularly, the capacitive interaction between each capacitive contact of the capacitive contact structure 111 and a capacitive touch sensor preferably vary based on the materials of the capacitive contact, the spatial variance of those materials, and the presence and characteristics of electrical connection to the current coupler 113. Preferably, the capacitive contact structure 111 is metallic and electrically conductive. Alternatively, the capacitive contact structure 111 can be partially metallic, primarily metallic with a partial coating of an insulating material, semiconductive, or any other suitable material with any other suitable properties that allow capacitive interaction between a capacitive touch sensor and the capacitive contact structure 111. Each of the capacitive contacts 115 is preferably circular in shape, and preferably comprises an exposed circular area at a portion of the surface 114 of the capacitive contact structure 111 as shown in FIG. 3, but alternatively can be of any suitable three dimensional shape that presents a substantially flat face of any suitable geometry such that the plurality of flat faces makes up a set of conductive capacitive contacts 115. As a further alternative, the capacitive points can be arranged in a contiguous shape (e.g., a spiral, a maze-like pattern, an amorphous blob, etc.).

The capacitive contact structure 111 is preferably fabricated as part of the substrate 112, but may alternatively be attached to the substrate 112, embedded in the substrate 112, or coupled to the substrate 112 with any other suitable means. The surface 114 of the capacitive contact structure 111 is preferably flush with at least one surface of the substrate 112, but can alternatively be recessed or raised from the surface of the substrate 112. As a further alternative, the surface 114 can be made up of a number of discontinuous areas that are coplanar and flush with one planar surface of the substrate 112.

The substrate 112 functions to electrically isolate the capacitive contacts 115 of the capacitive contact structure 111 from one another and to mechanically support the capacitive contacts 115 and the current coupler 113. The substrate 112 is preferably fabricated from a dielectric material in order to provide electrical isolation but may also be a semiconductor or any other suitable material. The substrate 112 may additionally function to mechanically support the SWA 120 and its subcomponents.

In one variation, the substrate 112 is a shaped like a stackable building block (e.g., a LEGO™ block) and can be mechanically coupled to other stackable building blocks by fitting them together. This preferably permits the CHA 110 and the SWA 120 to be removably coupled together, which can allow the capabilities of the CHA 110 and/or the SWA 120 to be added to a structure made of stackable blocks and/or modules. In this example configuration, the substrate 112 is a stackable building block in the shape of a rectangular prism topped by one or more cylindrical pegs, and at least one of the faces of the rectangular prism is coplanar with the surface 114 of the capacitive contact structure 111. The stackable building block can be affixed to additional stackable building blocks, which may include one or more stackable building blocks containing a SWA 120, and the combined set of stackable building blocks would then include at least a CHA 110, with all the attendant advantages thereof.

The current coupler 113 functions to electrically couple one or more capacitive contacts 115 of the capacitive contact structure 111 to a current source or a current sink. The current coupler 113 preferably functions to make electrical connections to the capacitive contact structure 111. The current coupler 113 is preferably also connected to a current source or current sink, but may alternatively be unconnected. The current coupler 113 is preferably made of metal, but may alternatively be made of any conducting or semiconducting material. The current coupler 113 is preferably fabricated as part of the substrate 112 but may alternatively be fabricated separately.

In a first variation, the current coupler 113 is preferably unconnected and positioned so that when the system 110 is in contact with a person, the current coupler 113 electrically couples to the person. This electrical coupling preferably is direct contact of the skin to the current coupler 113, but may alternatively be indirect contact. This enables the person to serve as a current sink. When the current coupler 113 is electrically coupled to a person or other current sink, the capacitive contact structure 111 coupled to that current coupler 113 preferably provide a path for current to travel away from a capacitive touch sensor. For PCT sensing technology with mutual capacitance sensors, this causes a drop in capacitance, which can trigger a touch event. When the same current coupler 113 is electrically isolated, the capacitive contact structure 111 coupled to that current coupler 113 can cause a raised capacitance for PCT sensing technology with mutual capacitance sensors, which may not be able to trigger a touch event. In this embodiment, the CHA 110 is preferably available for authentication only when in contact with a person or connected to another current sink. The CHA 110 may include multiple current couplers 113 in different positions, for instance, to allow different patterns of capacitive interaction depending on how the system 100 contacts a person.

The SWA 120 functions to perform short-range wireless authentication on systems equipped with short-range wireless communicators. The SWA 120 preferably is based on RFID technology, but may additionally or alternatively be based on NFC technology, BLE technology, Bluetooth™ technology, Wi-Fi™ technology, cellular radio technology, or any other suitable short-range wireless communication technology.

Figure 4:
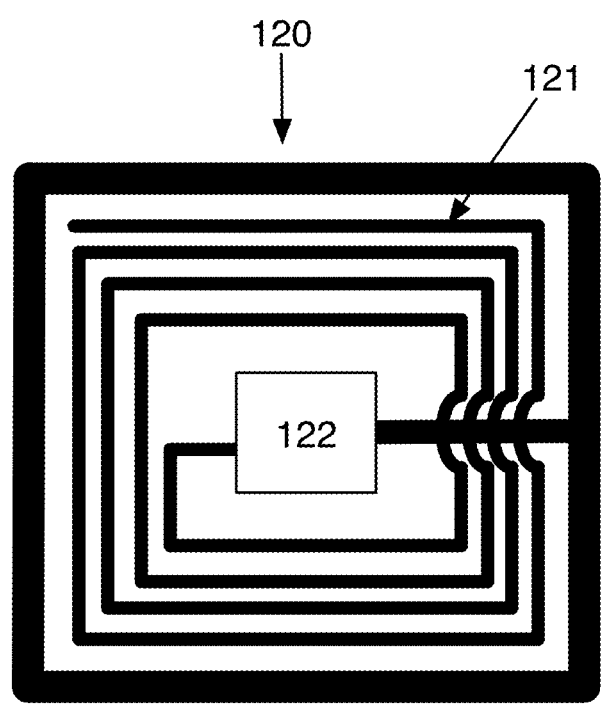
FIG. 4 is a schematic view of a short-range wireless authenticator (SWA) of a preferred embodiment.

The SWA 120 preferably includes an antenna 121 and an integrated circuit 122 as shown in FIG. 4. The SWA 120 is preferably adapted for passive backscatter communication; that is, the SWA 120 preferably transmits information by backscattering a signal transmitted by a reader using power transmitted by the signal. Additionally or alternatively, the SWA 120 may adapted for other passive communication types (e.g., near-field signal modulation as in LF/HF RFID tags), battery-assisted passive communication types (e.g., BAP RFID) or for active communication types (e.g. active RFID, BLE, etc.). If the SWA 120 uses active communication, the SWA 120 preferably includes a battery or other power source.

The antenna 121 functions to receive information from and/or transmit information to an electronic system with a compatible short-range wireless communicator (e.g., a radiofrequency sensor). The antenna 121 preferably also powers the integrated circuit 122 (as in the case of passive RFID) from received electromagnetic signals, but the integrated circuit 122 may additionally or alternatively receive power from another source. The antenna 121 is preferably a rectangular spiral antenna made of a conductive material (e.g. copper) but may additionally or alternatively be any suitable antenna. The antenna 121 is preferably electrically coupled to the integrated circuit 122.

The integrated circuit 122 functions to transmit authentication information and/or other information via the antenna 121 to a short-range wireless communicator (e.g. an RFID tag reader or a BLE equipped computer). The integrated 122 preferably includes a circuit designed to alter the impedance of the antenna 121 in order to produce a modulated backscattered signal, but may additionally or alternatively include a microcontroller, processor, or any other suitable circuitry able to convey information via the antenna 121. The integrated circuit 122 preferably includes memory, which stores the information transmitted via the antenna 121. The memory of the integrated 122 may be read-only or read-write (i.e., modifiable). If the memory of the integrated circuit 122 is dynamic, the memory is preferably programmable over-the-air (i.e. the memory can be altered by a signal transmitted to the SWA 120), but may additionally or alternatively be programmable only by a connected circuit (e.g., a flashing circuit or controller).

Figure 5:
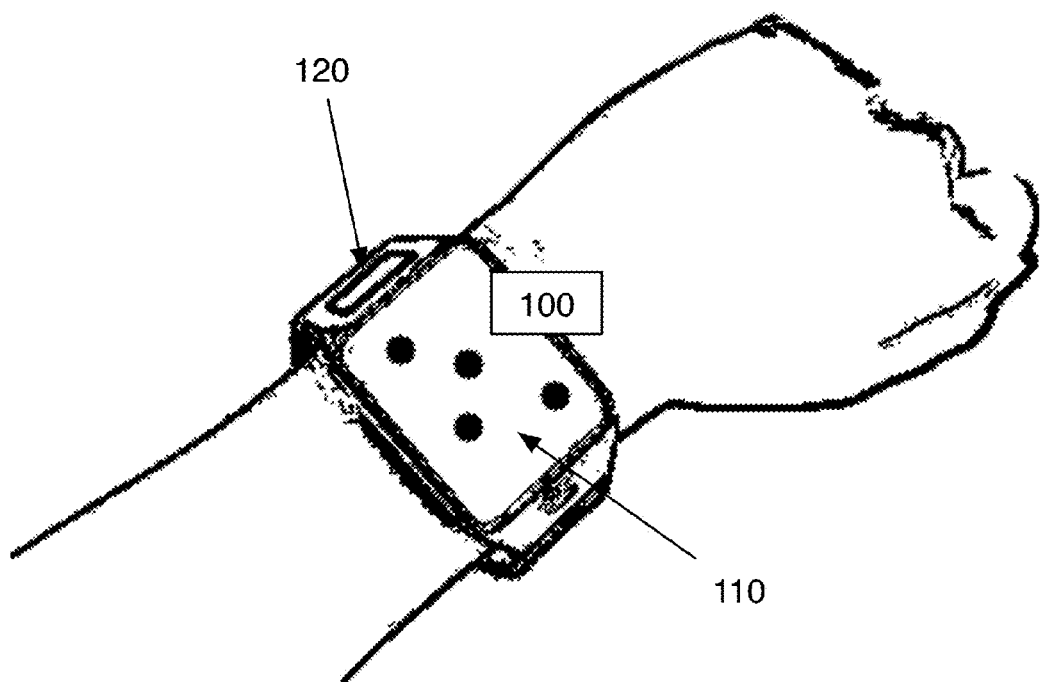
FIG. 5 is an example view of a system of a preferred embodiment.

The CHA 110 and SWA 120 are preferably physically coupled to each other, though not necessarily directly. For example, the CHA 110 and SWA 120 may be integrated into a bracelet, as shown in FIG. 5. Alternatively, the CHA 110 and SWA 120 of the system 100 may be physically distinct from one another. For example, the system 100 may consist of a CHA 110 similar to the one shown in FIG. 1, while the SWA 120 may be a physically separate RFID tag. The CHA 110 and SWA 120 may be fixed to a shared chassis or other connecting element (e.g. a bracelet) or removably coupled to the shared chassis; in the bracelet example, the CHA 110 and SWA 120 may both be sewn into a bracelet (resulting in the CHA 110 and SWA 120 being fixed to the bracelet) or one or both of the CHA 110 and SWA 120 may be clipped onto the bracelet (resulting in one or both of the CHA 110 and SWA 120 being removable from the bracelet).

Figure 6:
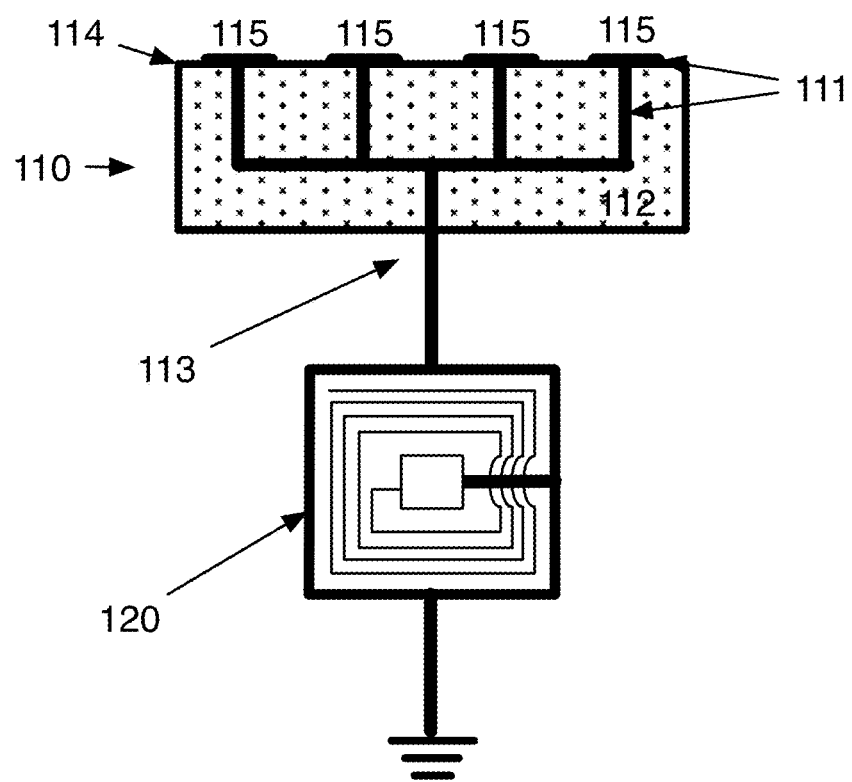
FIG. 6 is a schematic view of a system of a preferred embodiment.
Figure 7:
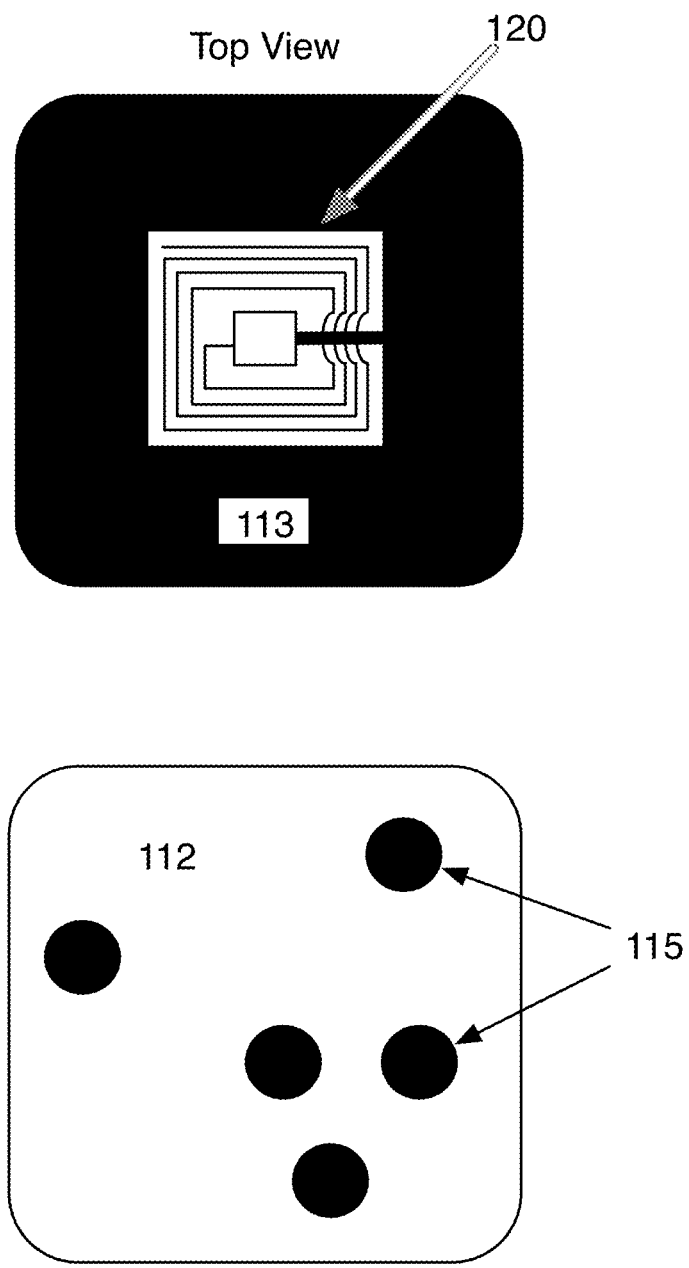
FIG. 7 is a schematic view of a system of a preferred embodiment.

The CHA 110 and SWA 120 may additionally or alternatively be electrically coupled, allowing the CHA 110 to affect performance of the SWA 120 and/or vice versa. In one variation of a preferred embodiment, the current coupler 113 of the CHA 110 is electrically coupled to an electrical ground of the SWA 120, as shown in FIG. 6. When the CHA 110 is placed into proximity with a capacitive touch sensor, the current passing through the current coupler 113 is preferably utilized to alter performance of the SWA 120 by changing the bias of the antenna 121 relative to the electrical ground of the SWA 120. This may alter antenna 121 frequency response and/or other characteristics. This could enable the system 100 to produce different responses (when interrogated by a short-range wireless communicator) when the CHA 110 is capacitively interactive with a touch sensor than when the CHA 110 is not capacitively interactive with a touch sensor. In some implementations of this variation, the CHA 110 is fabricated as part of an electrical ground plane of the SWA 120, as shown in FIG. 7. In other implementations of this variation, the system 100 incorporates ferroelectric materials in series or in parallel with the antenna 121 to alter antenna 121 capacitance based on voltage generated by current flow through the current coupler 113.

Figure 8:
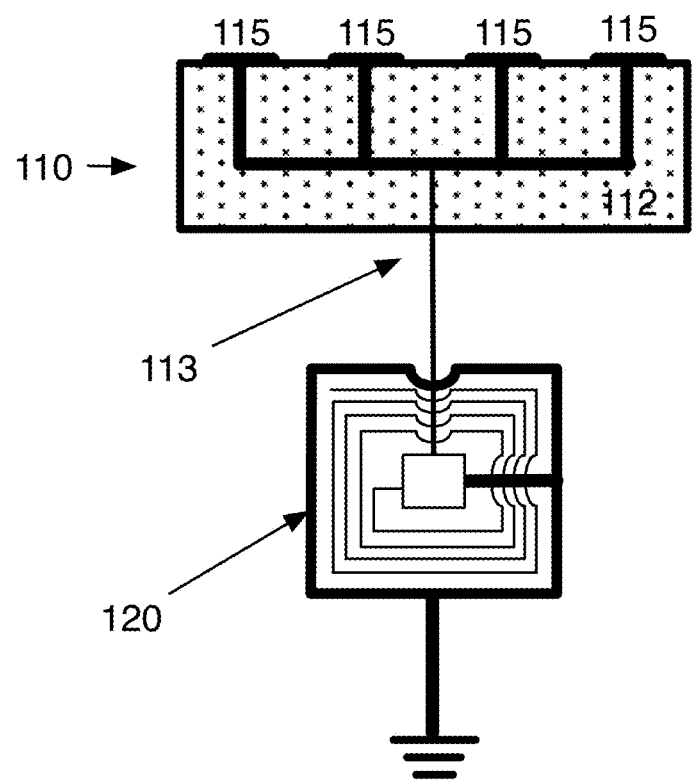
FIG. 8 is a schematic view of a system of a preferred embodiment.

In a second variation of the preferred embodiment, the current coupler 113 of the CHA 110 is electrically coupled to the integrated circuit 122 of the SWA 120 (preferably in a manner other than coupling through a ground connection of the integrated circuit 122) as shown in FIG. 8. In this variation, the integrated circuit 122 is preferably able to sense current flow through the current coupler 113 (indicating that the CHA 110 is in close proximity or contact with a capacitive touch sensor). Note that current flow may be sensed directly (through current measurements) or indirectly (through voltage measurements); current flow may be sensed using any suitable technique capable of detecting whether current is above a threshold value. The integrated circuit 122 preferably performs an action upon detection of current flow through the current coupler 113 (which may occur only when the SWA 120 is being interrogated by a short-range wireless communicator in the case of passive RFID). Actions performed by the integrated circuit 122 may include changing memory of the SWA 120 (e.g. a "current detected" flag being switched on or off, or a short section of memory containing a current measurement) or altering the signal sent by the SWA 120 (e.g. modifying the parameters of backscatter modulation). Additionally or alternatively, the SWA 120 may harvest energy from current passing through the current coupler 113 or from electromagnetic waves received by the antenna 121. Harvested energy may be stored in a battery 123 coupled to the SWA 120, but may additionally or alternatively be used immediately by the SWA 120 or may be stored in any other suitable location.

Figure 11:
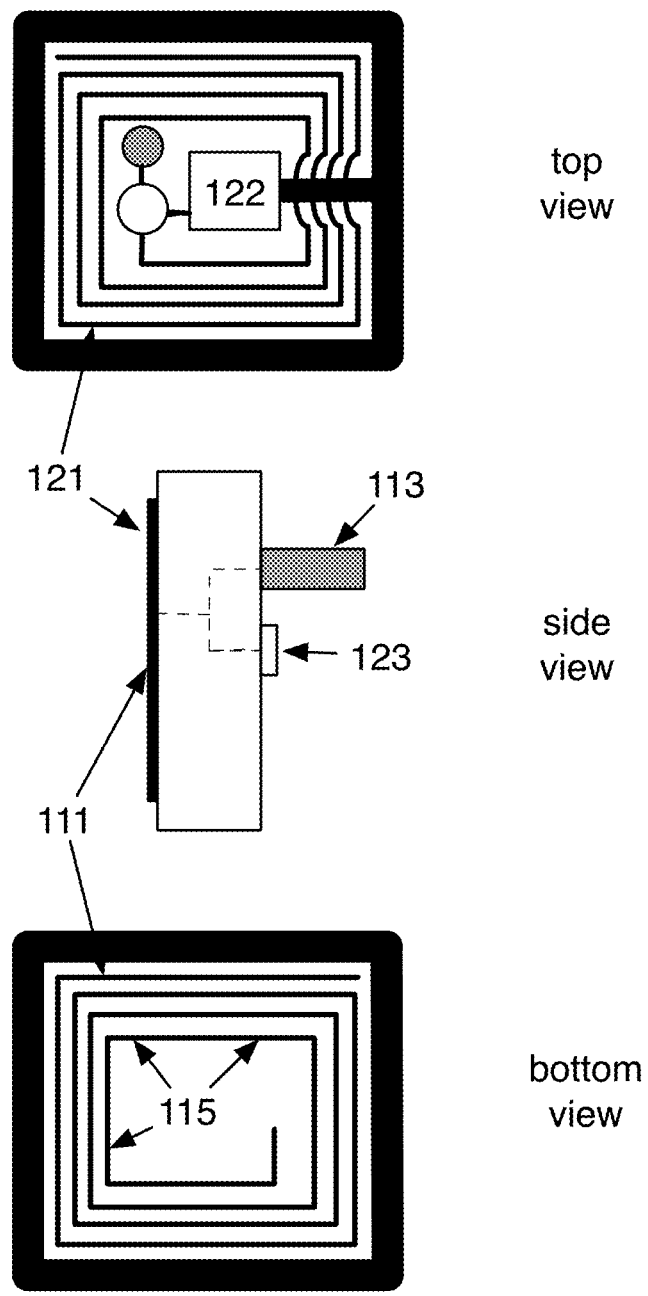
FIG. 11 is a schematic view of a system of a preferred embodiment.

In a third variation of the preferred embodiment, a portion of the antenna 121 of the SWA 120 forms the capacitive contacts 115 of the CHA 110. In this variation, an example of which is shown in FIG. 11, the system 100 can include a switch 123 that functions to isolate the antenna 121 from the current coupler 113 when the switch 123 is actuated. The purpose of the switch 123 is to enable the portion of antenna 121 to behave as the capacitive contact structure 111 when the system 100 is undergoing a capacitively enabled interaction, and to behave as a suitable antenna, without undue interference from other conductive components, when the system 100 is undergoing a short-range wireless interaction. Preferably, the switch 123 is a two-position toggle switch in which the first position corresponds to an electrical connection between the antenna 121 and the current coupler 113 and the second position corresponds to disconnecting the electrical connection. Alternatively, the switch 123 may be a push-button switch, a toggle switch with more than two positions, a transistor, or any other suitable means for connecting and disconnecting the antenna 121 and current coupler 113. As a further alternative, there may be no switch 123 at all and the transition between CHA 110 mode and SWA 120 mode can be accomplished through any other suitable manner.

Figure 9:
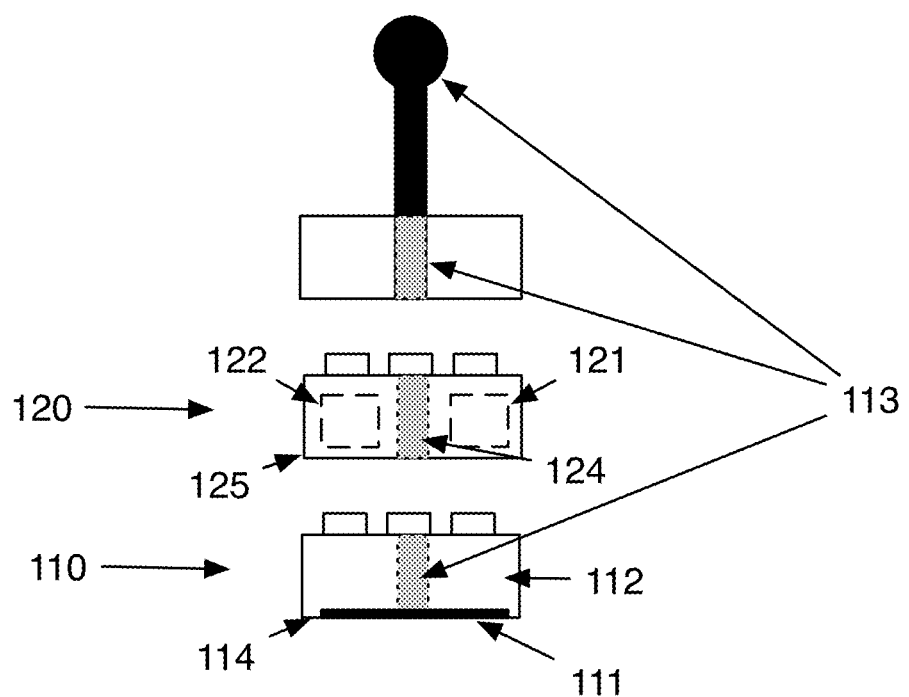
FIG. 9 is a schematic exploded view of a system of a preferred embodiment.
Figure 10:
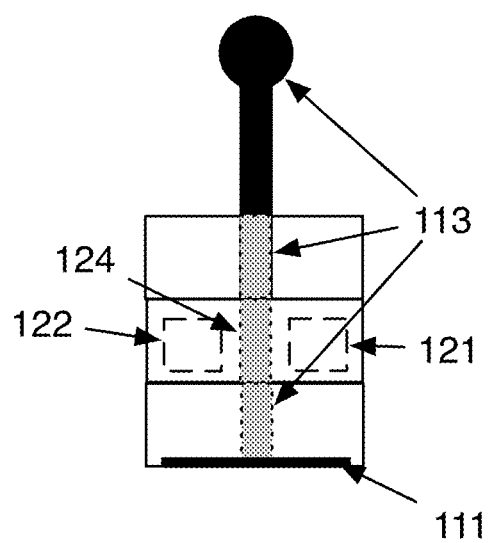
FIG. 10 is a schematic view of a system of a preferred embodiment.

In a fourth variation of the preferred embodiment, the CHA 110 and SWA 120 are removably coupled. In this variation, an example of which is shown in FIG. 9 and FIG. 10, the SWA 120 includes a second substrate 125 and a current passthrough 124. The second substrate 125 is similar to the variation of the substrate 112 discussed above that is shaped like a toy block (e.g., a LEGO™ block), such that the CHA 110 and the SWA 120 are each configured as toy blocks that can removably connected, preferably by being press-fit together. The second substrate 125 functions as a mechanical support for the components of the SWA 120 and for the current passthrough 124, as well as comprising an interface for the substrate 112 of the CHA 110. The interface preferably includes protruding cylindrical pegs or recessed voids configured to receive cylindrical pegs, but may alternatively be any suitable interface that allows the substrate 112 and the substrate 125 to couple together. The second substrate 125 is preferably made of the same dielectric material as the substrate 112 (e.g., a thermoplastic), but alternatively can be made out of any electrically insulating or semiconductive material that possesses suitable mechanical properties to mechanically support to the components of the SWA 120. The current passthrough 124 functions to electrically connect the capacitive contact structure 111 to the current coupler 113 through the second substrate 125. The current passthrough 124 is preferably a via through the second substrate 125, but can alternatively be a pathway around the substrate 125, along the surface of the substrate 125, a standalone connection (e.g., a wire), or any other suitable conductive pathway. Preferably, the current passthrough 124 isolates the capacitive contact structure 111 from the antenna 121 and integrated circuit 122 of the SWA 120, but alternatively can electrically connect to the antenna 121 and/or the integrated circuit 122. The current passthrough 124 is preferably made of a conductive material (e.g., copper), but can alternatively be made out of a semiconductive material or any other suitable material.

2. Method for Hybrid Hardware Authentication

Figure 12:
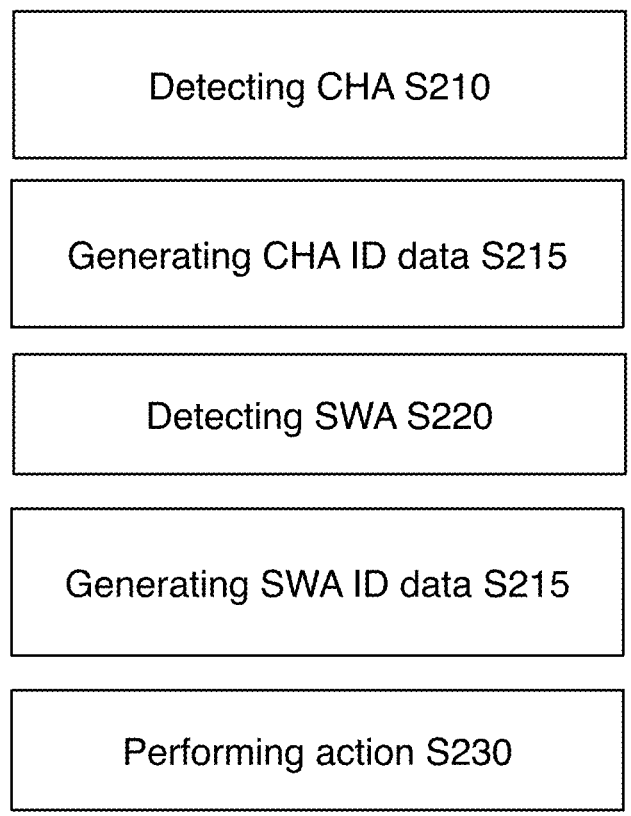
FIG. 12 is a chart view of a method of a preferred embodiment.

As shown in FIG. 12, a method 200 for hybrid hardware authentication using a hybrid hardware tool includes detecting a capacitive hardware interaction between the hybrid hardware tool and a capacitive touch sensor S210, generating capacitive identification data based on the capacitive hardware interaction, detecting a short-range wireless interaction S220 between the hybrid hardware tool and a radiofrequency identification sensor, generating wireless identification data based on the wireless interaction, and performing an action based on a combination of the wireless identification data and the capacitive identification data.

The method 200 functions to enable the use of two authentication methods (authentication by CHA/capacitive hardware interaction and authentication by SWA/short-range wireless interaction) in conjunction with the use of electronic systems. The use of multiple authenticators may provide for a number of advantages over single-authenticator methods. For example, multiple authentication methods may be used to increase security by increasing the amount of unique identification data available for authentication; that is, if there is some number n of possible unique CHA identifiers and some number m of possible SWA identifiers, the number of unique identifiers available for authentication is k=nm if both identifiers are used. The use of multiple authenticators may also allow for authentication with independent and/or indirectly connected electronic systems. For example, a toy including a CHA and SWA may use the CHA to communicate with a smartphone, but use the SWA to communicate with an NFC-equipped gaming console peripheral. The use of multiple authenticators can also be used to communicate different types of information to a single electronic system. For example, a figurine including a CHA and SWA can use the CHA to launch actions by capacitively interacting in real time with a game being played on an NFC-equipped tablet with a capacitive touchscreen, and use the SWA to periodically validate the authenticity of the figurine via NFC communication with the tablet.

The method 200 may use the two authentication methods to provide additional security or identification ability for a single action on an electronic system (e.g., opening a door based on both on a CHA-containing keychain and a SWA-containing RFID card), or to enable separate actions on an electronic system (or linked electronic systems) based on each of CHA and SWA authentication (e.g., detecting a theme park patron is near a display screen by detecting a SWA and calling out their name, and then detecting the CHA of a theme park patron to authenticate a purchase), or to enable separate actions on un-linked electronic systems (e.g. enabling a character in a console game when SWA is detected by a console and enabling the same character in a mobile game when CHA is detected by a smartphone).

Step S210, detecting a capacitive hardware interaction between the hybrid hardware tool and the capacitive touch sensor, functions to detect the presence of a CHA at a first electronic system. Step S210 preferably includes detecting a CHA at a capacitive touch sensor as described in the system 100 description, but may additionally or alternatively include detecting a CHA in any suitable manner.

Step S210 preferably includes identifying the CHA based on a parameterized description of the results of capacitive interaction between the CHA and the capacitive touch sensor (e.g., the pattern of touches detected by the capacitive touch sensor). This preferably includes detecting a set of points of capacitive contact on a capacitive touch sensor, and subsequently computing a set of parametric descriptors from the set of points. Points of capacitive contact preferably include electrically conductive areas on a surface of the hybrid hardware tool, but can alternatively include any conductive area and/or volume of the hybrid hardware tool that induces a suitable capacitive interaction at a capacitive touch sensor (or similar sensor) when the hybrid hardware tool is proximal the sensor. Examples of parametric descriptors include the relative position of each point in the set of points, the relative size and/or area of the points of capacitive contact, and the spacing of concentric loops in a spiral pattern. These parametric descriptors preferably comprise a parameterized description of the CHA, but may additionally or alternatively comprise a parameterized description of the entirety of the hybrid hardware tool, or any other suitable characteristic of the hybrid hardware tool.

A variation of Step S210 additionally includes detecting a time sequence of capacitive hardware interactions, which functions to detect gestures, motions, tapping sequences, and similar behaviors performed at a capacitive touch sensor using the hybrid hardware tool. In this variation, the parameterized description preferably comprise a time history of capacitive interaction patterns, e.g., rotation, sliding, and/or swirling of the set of points of capacitive contact. Alternatively, the parametric descriptors can describe the set of points of capacitive contact being detected in the same manner, several times over the course of a time interval (e.g., tapping the CHA multiple times against a capacitive touch screen).

Step S215, generating capacitive identification data based on the detected capacitive hardware interaction, functions to provide an output based on the parameterized description of the CHA. Once a parameterized description of the CHA has been detected, S215 preferably includes comparing the description to known CHA descriptions (e.g., via a database, a list, an algorithm) at the first electronic system. Capacitive identification data preferably includes the output of this comparison, e.g., whether the computed parameterized description is present in a database or list, the user to whom the parameterized description of the hybrid hardware tool corresponds, or any other suitable data associated with the parameterized description. Based on the capacitive identification data, the CHA can then be used to authenticate or launch a particular event associated with the CHA. Examples of CHA identification and capacitive identification data that may be utilized by the method 200 are described in U.S. patent application Ser. No. 13/385,049 and U.S. Patent Application Ser. No. 61/937,015, both of which are incorporated in their entireties by this reference.

Step S220, detecting a short-range wireless interaction between the hybrid hardware tool and a second electronic system, functions to detect the presence and features of a SWA at the second electronic system. Step S220 preferably includes detecting a SWA using a short-range wireless communicator (e.g., a radiofrequency sensor) as described in the system 100 description, but may additionally or alternatively include detecting a SWA in any suitable manner.

Step S220 preferably includes identifying the SWA based on identification data transmitted by the SWA when queried, but may additionally or alternatively include identifying the SWA in any other suitable manner. S220 is preferably performed by a reader of the second electronic system transmitting radio waves to the hybrid hardware tool, and obtaining information from the radiofrequency module as described in the system 100 description, e.g., from an RFID tag of the hybrid hardware tool via modulated passively backscattered radio waves. In a variation of a preferred embodiment, S220 only includes detecting the presence of a SWA and not receiving any identifying data from it. This might be useful when a SWA is only used for proximity detection.

Step S225, generating wireless identification data based on the detected short-range wireless interaction, functions to provide an output based on the features of the wireless interaction. If a short-range wireless interaction signature is detected by the second electronic system, the signature may be compared to known SWA signatures (e.g., via a database, a list, an algorithm) by the second electronic system. Wireless identification data preferably includes the outcome of this comparison, e.g., whether the signature is present in a database or list, the user to whom the signature of the hybrid hardware tool corresponds, or any other suitable data associated with the signature. Based on the results of this comparison, the wireless identification data can then be used to authenticate or launch a particular event associated with the SWA.

The second electronic system (that detects the SWA/short-range wireless interaction) is preferably linked in some way (e.g. shares a database with) to the first electronic system (that detects the CHA/capacitive hardware interaction). Additionally or alternatively, the first and electronic systems may be completely independent. In one variation of a preferred embodiment, the first and second electronic systems are the same system.

In one variation of the method 200, the wireless identification data is classification data, and the capacitive identification data is uniquely identifying data. Classification data is preferably data that comprises a categorical description of the hybrid hardware tool or a user of the hybrid hardware tool. Examples of classification data include the type, purchase date, color, and/or size of the hybrid hardware tool, and also include the age, gender, preferences, and/or characteristics of the user of the hybrid hardware tool. Uniquely identifying data is preferably data that distinguishes an individual hybrid hardware tool from a population of hybrid hardware tools. Examples of uniquely identifying data include a serial number, identification number, or any other suitable unique signature of the hybrid hardware tool, and also include the identity and/or signature of the specific user of the hybrid hardware tool. In an example embodiment of this variation, the hybrid hardware tool is a toy weapon for use in a virtual game, and classification data comprises the weapon category (e.g., hand-to-hand combat weapon, long-range ballistic weapon, etc.) and uniquely identifying data comprises the serial number of the toy weapon, identifying it as an authentic and unique physical object distinct from other iterations of the same toy weapon that may have been sold to other users.

Figure 13:
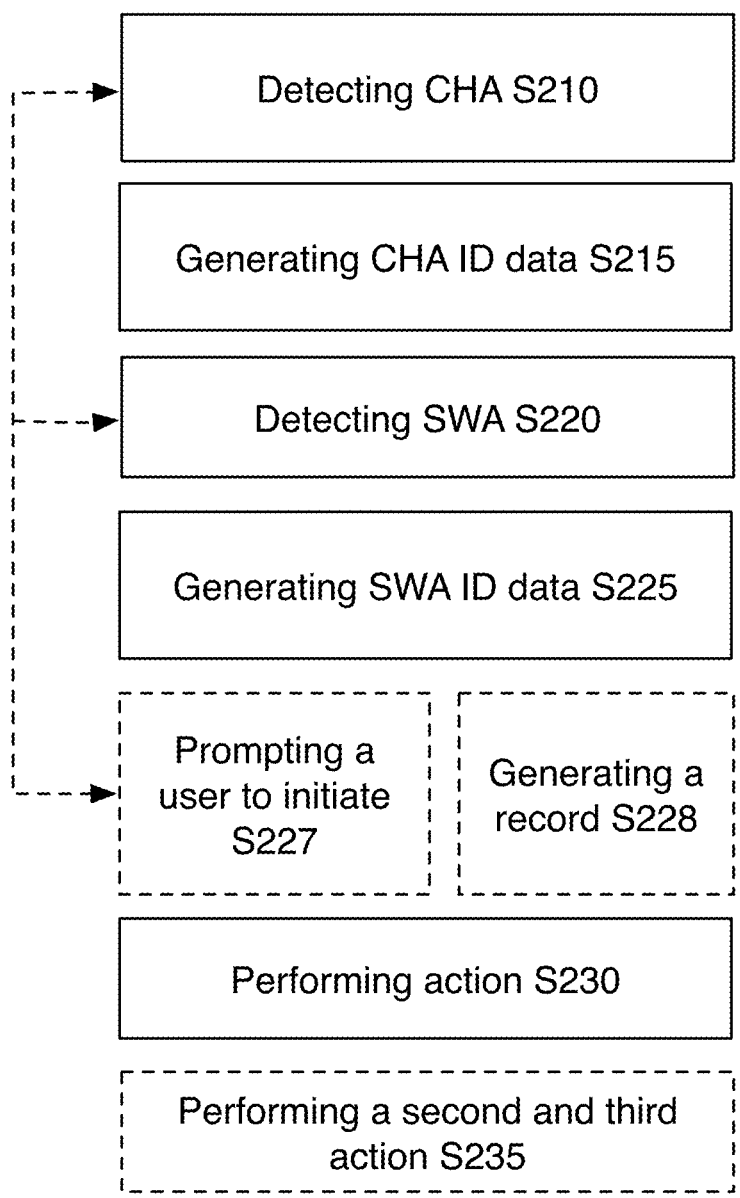
FIG. 13 is a chart view of a method of a preferred embodiment.

As shown in FIG. 13, the method 200 can optionally include Step S227, prompting a user to initiate a capacitive hardware interaction at the first electronic system based on the wireless identification data, functions to prompt a user to capacitively interact with the first electronic system using the hybrid hardware tool as a result of the second electronic system detecting a short-range wireless interaction. The first and second electronic system in this variant are preferably physically coupled and/or the same electronic system, but alternatively can be indirectly linked (e.g., share a database and/or data linkage) or possess any suitable connection that permits a prompt to be presented to the user at the first electronic system. A prompt is preferably a message displayed on a touch screen of the first electronic system, directing the user to place a CHT or similar device adjacent to the touch screen. One variation of prompting the user can be to display a highlighted region on a touchscreen, in which the user is directed to place a CHT or similar device for authentication. Alternatively, the prompt could be a visual indicator (e.g., a blinking light) or auditory indicator (e.g., a beeping noise or recorded spoken instructions) that suitably direct the user.

In a variation of Step S227, the wireless identification data is location data, and S227 can include prompting the user to initiate the capacitive hardware interaction based on the location data. Location data is preferably data that conveys the physical and/or geographic position of the hybrid hardware tool, but can alternatively be data that conveys similar attributes of the user, or any other suitable location data. An example implementation of this variation of S227 includes detecting (via the SWA) that a user wearing a hybrid hardware tool in the form of a wristband has entered a cafeteria, and then prompting the user to place the wristband against the touch screen of a payment terminal at the entrance to the cafeteria for the purposes of initiating payment.

In another variation of Step S227, the wireless identification data is proximity data. Proximity data is preferably data that conveys whether the hybrid hardware tool is above or below a threshold distance from at least one of the first, second, and third electronic systems. This is distinct from location data, in that proximity data is threshold-based and does not necessarily include the geographic location of the hybrid hardware tool beyond that it is proximal to an electronic system capable of detecting it. For example, proximity data may be a response of any kind from the SWA (e.g., a passive modulated backscatter RFID chip) when the hybrid hardware tool is within range of a reader (radiofrequency sensor), indicating that the hybrid hardware tool is proximal the reader.

As shown in FIG. 13, the method 200 can optionally include Step S228, generating a record at the second electronic system based on at least one of the capacitive identification data and the short-range wireless interaction data, and transmitting the record to at least one of the hybrid hardware tool, the first electronic system, and the third electronic system, functions to save information pertaining the CHA and/or the SWA and store it on the hybrid hardware tool and/or one of the electronic systems in order to use the information for further authentication events at a later time. Preferably, the record includes data concerning the time the capacitive identification data and/or wireless interaction data was generated. Alternatively, the record can comprise confirmation that a capacitive and/or wireless interaction occurred, details of the interaction, or any other suitable data comprising a record of an interaction involving the hybrid hardware tool than can be stored and/or transmitted.

Step S230, performing an action based on a combination of the wireless identification data and the capacitive identification data, functions to enable the use of the combined CHA and SWA presence/data for authentication or action launching at a third electronic system.

Step S230 may include performing an action based solely on detection (e.g., detecting a SWA is in range), based on identification (e.g., authenticating based on both of a SWA identifier and a CHA identifier), or based on actions performed by or using the CHA and/or SWA (e.g., performing an action based on how a CHA is moved across a touchscreen, or performing an action based on command data transmitted by the SWA).

Step S230 may include performing actions based on pre-linked (linked) data (i.e., data linked to capacitive and/or short-range wireless identification data that has been stored in at least one of the first, second, and third electronic systems prior to a capacitive hardware interaction or short-range wireless interaction). Examples of linked data for an authenticator may include information about the authenticator type, content linked to the authenticator, ownership information relating to the authenticator, and/or user stored information relating to the authenticator. Linked data may not necessarily be linked exclusively or directly to the authenticator; though, another example of linked data includes archived financial data behind a pay wall that can be accessed using one of several different authentication methods; in this case, the data may be simply linked to a successful authentication using any of those methods.

Step S230 can include performing actions based on combined data; i.e., data created from combinations of CHA and SWA identification data (or other data transmitted by or related to the CHA and/or SWA). For example, an identifier for system access may be stored as form XXXX-YYYY where XXXX represents a CHA ID and YYYY represents a SWA ID—successfully authentication would require receiving both the CHA ID and the SWA ID.

A variation of S230 can include performing an action based on a comparison of the wireless identification data to the capacitive identification data, which functions to verify that the wireless identification data and the capacitive identification data are identical. This variation can use the SWA and CHA as two parts of a dual-authentication step, in which both the capacitive interaction and the short-range wireless interaction encode the same information and detecting both is necessary to perform the action. An example of this variation is that the capacitive identification data comprises a user ID number, and the wireless identification data comprises the same user ID number, and when the third electronic system compares the two data types it confirms that both methods provide the same user ID number and subsequently permit the user to access the third electronic system.

In another variation of S230 in which S238 has been included, the action is performed based also on at least one record in combination with the wireless interaction data and/or the capacitive interaction data. This variation can include allowing access to the third electronic system only if a record of a previous interaction exists, or if no record exists. For example, a user can receive access to a game upon capacitive hardware authentication if no access has been granted in the last 24 hours, or alternatively if an authentication had occurred in the last 24 hours. In another example, a database can contain a record of a SWA-based authentication event having occurred, and then a CHA-based interaction can occur and access may be granted on the basis of the record (retrieved from the database) in combination with the capacitive identification data. The record can be stored at the hybrid hardware tool in memory (optionally included as described in the system 100 description), and used to affect subsequent capacitive and/or wireless interactions. In this further variation, a wireless interaction can result in a record of the interaction being stored at and/or transmitted to the hybrid hardware tool, and the record can be used to modify the wireless interaction that is detected by the second electronic system, resulting in modified identification data being generated at the second electronic system and preferably a different action being performed. For example, the hybrid hardware tool could be a one-time-use token, and upon capacitive and/or wireless authentication a record of its use is stored at the hybrid hardware tool and inhibits further capacitive and/or wireless authentication. Alternatively, the record in this example could be stored in a database linked to any of the first, second, and/or third electronic systems and be used to inhibit further authentication by retrieving the record from the database.

As shown in FIG. 13, the method 200 can optionally include a Step S235, performing a second action based on the wireless identification data and performing a third action based on the capacitive identification data, which functions to launch interaction-specific actions independently of one another and of the first action, which is performed based on the combined interaction data. S235 is preferably performed by the first and second electronic systems acting independently and corresponding to the respective interactions (wireless and capacitive) detected by each system. Alternatively, S235 can be performed by the first and second electronic system acting in concert, or a separate linked and/or unlinked electronic system, or any other suitable electronic system. In an example application of S235, an action figurine comprising the hybrid hardware tool is detected by the capacitive touch screen of a tablet while playing a multiplayer virtual role-playing game. The action figurine is also detected by the tablet via NFC. When the action figurine is placed against the touch screen, the capacitive identification data is generated and directs an in-game, real time action (e.g., performing an attack in the game). The wireless identification data, in contrast, is used to perform the action of adding the virtual representation of the action figurine to a group of virtual representations of other players' similar action figurines.

Actions performed by Step S230 may include any action performable on an electronic system, including sending a notification, displaying a message, changing a data value, allowing access to a system, or any other suitable action.

In another variation of the method 200, the first, second, and third electronic systems are all subsystems of a fourth electronic system. The fourth electronic system is preferably a device that comprises both a capacitive touch screen and a radiofrequency communicator (e.g., an RFID reader, NFC radio, etc.) as well as a means for storing or accessing a database, linking to other electronic systems (e.g., over the Internet), or any other suitable method of interacting with a user and exchanging data related to the user and/or hybrid hardware tool. An example of the fourth electronic system is a tablet, with both a capacitive touch screen and an NFC radio, that is also capable of connecting wirelessly to the Internet.

3. Example Use Cases

The following use cases represent examples of uses for the system 100 and/or the method 200.

In a first example, a CHA and SWA are integrated into a wristband worn by theme park patrons. The SWA is used to make purchases and gain access to rides throughout the park. The CHA is used in conjunction with a smartphone app to manage the access and payment method afforded to the SWA. When the wristbands are first given to patrons, the patrons pair their SWAs and CHAs to their smartphone by authenticating the CHAs via a smartphone app. This app may be then be used to track or manage activity of the wristbands over SWA. For example, a parent may receive three wristbands: one for him/herself and two for each of his/her children. When the parent authenticates the CHAs for each wristband, he/she may set varying parameters for each; maybe a first child's wristband allows purchases (but limits the purchases to food only, and caps the limit), while a second child's wristband does not. Likewise, one child may be limited to a particular area of the park—if the child leaves the area (as detected by SWA communicators), the parent may be notified via text message.

In a second example, a CHA and SWA are integrated into a wristband worn by theme park patrons. The CHA and SWA are both linked to identifying information about patrons, but the CHA may be used to authenticate payment or other actions (while the SWA is primarily used for identification purposes). When a patron wearing a wristband walks up to a rollercoaster, there may be a large touchscreen outside the rollercoaster that displays an estimated wait time. As the patron walks by the touch screen, a speaker may call out "[Patron name], would you like fast lane access to this ride?" At this point, the patron may approach the screen, and by pressing a CHA against the screen, may associate the wristband (and the SWA) with a fast lane pass. Now, when the patron returns to the ride to use the fast lane access, it may be detected by SWA alone (e.g., by readers that route patrons into various lines). Likewise, the wristband may be used to order meals; walking near a restaurant touch display opens a menu trigged by SWA identification (which may be personalized based on SWA data), the patron may then purchase meals by touching a CHA to the screen and moving the CHA in a known authentication gesture (e.g., rotating the CHA 45 degrees clockwise and then 90 degrees counter-clockwise).

In a third example, a toy contains both a SWA and CHA. When playing a console video game, the SWA may be used to access a particular character in the video game. Likewise, the CHA may be used to access the same character in a smartphone game related to the console videogame. The character's level and other information may be stored in a database linked to one or both of the CHA and SWA ID data.

In a fourth example, a CHA is integrated into a first LEGO™ block and a SWA is integrated into a second LEGO™ block. When a LEGO™ figurine, the first block, and the second block are mechanically pressed together the modified figurine can be used for both capacitive and wireless authentication. In this example, the first block has a pattern of conductive strips that are of specified length, width, and relative position. The second block can contain a spiral antenna 121 and an embedded integrated circuit 122 configured to act together as a passive modulated backscatter RFID tag. A conductive pathway is preferably embedded in the second block that connects to the conductive strips of the first block such that when the figurine is attached to the second block, a conductive pathway is established and maintained between a conductive portion of the figurine and the conductive strips of the first block while the spiral antenna 121 remains electrically isolated from the capacitive contact structure 111. The first and second LEGO™ blocks may have linked data associated with their respective detectable signatures that is present in a remote server, which can be accessed from a touchscreen tablet with NFC communication capability. An interactive videogame that depends on interaction with a CHA and/or SWA can be played on the tablet. When the modified figurine is detected via a short-range wireless interaction, an avatar representation of the modified figurine appears in the virtual world of the video game. The avatar representation may be linked to the wireless identification data generated as a result of the wireless interaction. When the modified figurine is detected in a specific part of the touchscreen via a capacitive interaction, the avatar representation can move within the virtual world towards the part of the screen where the modified figurine was capacitively detected. Alternatively, when the modified figurine is tapped against the touchscreen, the avatar may perform an action in the videogame (e.g., jumping, opening a door, etc.).

The methods of the preferred embodiment and variations thereof can be embodied and/or implemented at least in part as a machine configured to receive a computer-readable medium storing computer-readable instructions. The instructions are preferably executed by computer-executable components preferably integrated with a computer system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A hybrid hardware tool for authenticating with a radiofrequency sensor and a capacitive sensor, the hybrid hardware tool comprising:
   a capacitively interactive module, comprising
      a capacitive contact structure comprising a set of capacitive contacts in unique spatial orientation to each other and attached to a surface at locations on the surface that represent a unique identifier;
      the capacitive contacts having a geometry representative of a fingertip impression and being electrically conductive;
      a first dielectric substrate, coupled to the capacitive contact structure; wherein the first dielectric substrate provides electrical isolation between the capacitive contacts;
      a current coupler comprising a conductive material, conductively connected to the set of capacitive contacts; wherein proximity of the set of capacitive contacts to the capacitive sensor results in a uniquely identifiable change of capacitance at the capacitive sensor when the current coupler is in physical contact with a capacitive body during operation of the hybrid hardware tool;
   a radiofrequency identification module, mechanically coupled to the capacitively interactive module, comprising
      an integrated circuit; and
      an antenna, electrically coupled to the integrated circuit; wherein proximity of the antenna to the radiofrequency sensor enables the transmission of data between the radiofrequency identification module and the radiofrequency sensor.

2. The hybrid hardware tool of claim 1, wherein the antenna comprises the set of capacitive contacts of the capacitively interactive module; wherein the antenna is configured to be detected as a set of points of capacitive contact by the capacitive sensor.

3. The hybrid hardware tool of claim 2, additionally comprising a switch, electrically and mechanically coupled to the antenna and the current coupler; wherein the switch is operable between an on state and an off state; wherein the on state electrically couples the antenna and the current coupler, and the off state electrically isolates the antenna and the current coupler.

4. The hybrid hardware tool of claim 1, wherein the radiofrequency identification module comprises a second substrate and a current passthrough; the first substrate is removably coupled to the second substrate; and the current coupler is electrically coupled to the capacitive contact area of the capacitively interactive module through the current passthrough.

5. The hybrid hardware tool of claim 4, wherein the current passthrough is coupled to the integrated circuit of the radiofrequency identification module.

6. A method for hybrid hardware authentication using the hybrid hardware tool of claim 1, the method comprising:
   at a first electronic system having a capacitive touch sensor, detecting a capacitive hardware interaction between the hybrid hardware tool and the capacitive touch sensor;
   generating capacitive identification data based on the detected capacitive hardware interaction;
   at a second electronic system communicatively coupled to the first electronic system, detecting a short-range wireless interaction between the hybrid hardware tool and the second electronic system;
   generating wireless identification data based on the detected short-range wireless interaction;
   at a third electronic system communicatively coupled to the first and second electronic systems, performing a first action based on a unique combination of the wireless identification data and the capacitive identification data that authenticates based on the unique combination of the wireless identification data and the capacitive identification data.

7. The method of claim 6, wherein the first, second, and third electronic systems are all subsystems of a fourth electronic system, wherein the fourth electronic system is a videogame console.

8. The method of claim 6, wherein detecting the short-range wireless interaction comprises detecting the proximity of the hybrid hardware tool to at least one of the first, second, and third electronic systems.

9. The method of claim 6, wherein the wireless identification data is classification data; wherein classification data comprises a categorical description of the hybrid hardware tool; wherein the capacitive identification data is uniquely identifying data; and wherein uniquely identifying data comprises a unique identifier of the hybrid hardware tool.

10. The method of claim 6, wherein performing the first action comprises performing the first action based on a comparison of the wireless identification data to the capacitive identification data and a verification that they are identical.

11. The method of claim 6, further comprising prompting a user to initiate a capacitive hardware interaction at the first electronic system based on the wireless identification data.

12. The method of claim 11, wherein the wireless identification data comprises location data, further comprising prompting the user to initiate the capacitive hardware interaction at the second electronic system based on the location data.

13. The method of claim 6, further comprising performing a second action based on the wireless identification data, and performing a third action based on the capacitive identification data.

14. The method of claim 13, wherein the second action is performed at the first electronic system, and the third action is performed at the second electronic system.

15. The method of claim 6, wherein detecting a capacitive hardware interaction comprises:
   detecting, on a capacitive touch sensor of the second electronic system, a set of points of capacitive contact from the hybrid hardware tool;
   computing, from the set of points, a set of parametric descriptors;
   creating a processed set of parametric descriptors based on the set of parametric descriptors and characteristics of the capacitive touch sensor; and
   generating a comparison of the processed set of parametric descriptors and a set of known parametric descriptors.

16. The method of claim 15, further comprising detecting a time sequence of capacitive hardware interactions.

17. The method of claim 6, further comprising performing the first action based on a further combination of pre-linked data with the combination of the wireless identification data and the capacitive identification data; wherein the pre-linked data is stored on at least one of the first, second, and third electronic systems prior to the short-range wireless interaction and the capacitive hardware interaction; wherein the pre-linked data comprises at least one of user account data, interaction history data, and environmental data.

18. The method of claim 17, wherein the performed action is permitting access to the third electronic system.

19. The method of claim 6, further comprising generating a record at the second electronic system based on at least one of the capacitive identification data and the short-range wireless interaction data, and transmitting the record to at least one of the hybrid hardware tool, the first electronic system, and the third electronic system.

20. The method of claim 19, further comprising storing the record at the hybrid hardware tool; wherein performing the action further comprises performing the action based on the record in combination with at least one of the short-range wireless interaction data and the capacitive hardware interaction data.

* * * * *